UNITED STATES PATENT OFFICE 2,379,319

PURIFYING DIFFUSION JUICE

Herman Schreiber, Lansing, Mich.

No Drawing. Application December 4, 1942,
Serial No. 467,910

7 Claims. (Cl. 195—11)

This invention relates to processes of purifying diffusion juice from sugar beets, and it comprises processes wherein the diffusion juice is treated with a proteolytic enzyme such as pepsin, and the thus-treated juice then limed and carbonated at temperatures markedly lower than those now used in the art of liming and carbonating such diffusion juice.

Standard practice in the purification of diffusion juice from sugar beets consists in heating the juice to 85° C., adding two to five percent of lime (based on the weight of beets) to the juice, maintaining the limed juice at a temperature of 85° C. or higher, carbonating the limed juice at this temperature, filtering, reheating the filtrate to near boiling, and re-carbonating to the desired alkalinity while at this high temperature, and finally filtering a second time.

The purpose of this treatment is to remove non-sugars from the diffusion juice prior to crystallization of the sugar therefrom. These non-sugars consist of pectins, protein substances, cellulosic materials, etc. If left in the juice they inhibit crystallization of the sugar. All juice purification processes have for their object the removal of as much non-sugar prior to crystallization as possible. The process is complex however, and the obstacles are many. Thus, liming and carbonating at the temperatures stated in prior art practice, which is present commercial practice, inherently puts into solution some of the substances which it is desired to eliminate before crystallization is attempted. For example, there are cellulosic materials, and pectins ("gums") in the juice which should be removed because they inhibit crystallization. Yet the liming and carbonating at temperatures of 85° C. or higher break these substances down, or otherwise degrade them so that, instead of being precipitated by the lime and carbonation, their degradation products are actually rendered soluble. However, such degradation products ("gums") nevertheless inhibit crystallization which in turn means less recoverable sugar in the crystallization thereof, and more sugar lost in the molasses.

Consequently it is plain that in the present or current practice a balance has been struck between fair removal of non-sugars and fair recovery of sugar. Any method by which more sugar can be recovered from a ton of beets is of major importance in this art because the ultimate end is the sugar obtained.

The art has tried to reduce liming and carbonating temperatures, but to no avail. The juice cannot be filtered and even less sugar is ultimately recovered when, for example, the liming and carbonating is conducted at temperatures as low as 70° C. to 80° C. Temperatures as high as 85° C. must be used to get what the skilled worker calls a "break," in the first carbonation and this temperature is always regarded as critical.

So, to sum up, liming and carbonating as low as 60° C. to 80° C. is ineffective; liming and carbonating at 85° C. and above is effective but the yield of sugar is decreased from what it might be because these temperatures throw into solution substances which inhibit crystallization. What is desired is some way of liming and carbonating at lower temperatures so as to avoid breaking down pectins, etc.; to "gums" which are soluble and do not precipitate but which do inhibit crystallization. That unique result has never hitherto been realized in the art.

I have now discovered ways by which diffusion juice can be purified at the stated lower temperatures (60° C. to 80° C.) and thus secure the advantages thereof, while avoiding all of the many disadvantages. My process is based on a combination of steps including the pre-treatment of the raw juice with a proteolytic enzyme such as pepsin, followed by liming and carbonating at temperatures of from about 60° C. to 75° C., and in any event, below those temperatures which would degrade pectins and celluloses present to yield soluble crystallization inhibitors. By "soluble crystallization inhibitors" I mean substances which are not precipitated by the current liming and carbonating.

Thus, an example of how my process can be practiced is as follows:

The raw diffusion juice is first treated with pepsin at a temperature of about 50–60° C. Rennet and other enzymes equivalent to pepsin can be used in place of pepsin. For each ton of beets I add about two-fifths of an ounce of U. S. P. pepsin. Advantageously the pepsin is first mixed with water (preferably an acidified water solution of pepsin containing where necessary small quantities of an accelerator or activator such as calcium chloride) and then the solution thereof added to the juice. The thus treated raw juice is allowed to stand for thirty minutes to an hour and a half at the stated temperature. Then the juice is heated to about 60–75° C. and 2 to 5 percent of lime, based on the weight of the beets is added. This quantity of lime is standard practice in the absence of pepsin, but the temperature at which the juice is maintained is not. I am here liming at temperatures hitherto quite inoperative for the successful treatment of the juice.

After liming the juice is then carbonated in accordance with standard practice until a break is obtained. However, the temperature at this stage is less than standard practice since the juice is not heated higher than 75–80° C. during carbonation. Next the juice is filtered and the filtrate heated to about 75° C., carbonated to lower alkalinity as usual, then heated to about 90° C. and filtered. The final heating temperature of 90° C. is lower than standard practice in the art.

From the above example it will be seen that no temperatures in excess of 75–80° C. are used when the juice still contains such an amount of lime (alkalinity) as would affect non-sugars therein to "solubilize" them. It is only after the second carbonation, and when the alkalinity is reduced to permissible limits, that the temperature of the juice is allowed to exceed 80° C. So at no time do I have highly alkaline juices at such a temperature that celluloses, pectins, "gums," etc., therein, are degraded by the alkali present.

The successful operation of my process can be attributed to the pre-treatment of the juice with the pepsin, combined with low liming and carbonating temperatures. The pepsin reacts with the protein impurities and the resulting protein digestion products, whatever they may be, are either precipitable with the lime and carbonation, or no longer require high temperatures at high alkalinity for their reaction. By first acting on the protein non-sugars in this fashion, I can then lime the juice with standard amounts of lime and get an increased benefit from such quantities of lime without using high temperatures. Therein is the crux of the matter. Removal or solution of the proteins by the pre-treatment enables me to get an increased advantage from the usual quantities of lime while avoiding the disadvantages of high temperature heretofore absolutely necessary in carbonation if such quantities of lime are to be most useful.

By my procedure I can thus remove more non-sugars from the diffusion juice before I crystallize the sugar therefrom. The purified juice contains less "gums" and less quantities of crystallization inhibitors. In fact, the removal of such gums is almost 100 percent. It is directly attributable to a pre-treatment with pepsin or other proteolytic enzyme which in turn enables me to lime and carbonate at temperatures at which "gum" solution is negligible. Thus the purified juice has increased purity and increased filterability, and the yield of sugar from a ton of beets may be increased markedly.

Having thus described my invention what I claim is:

1. The process of purifying raw diffusion juice from sugar beets which comprises pre-treating the juice with a proteolytic enzyme selected from the group consisting of pepsin and rennet to act on the protein constituents in the juice, and then liming and carbonating the thus treated juice at temperatures below 85° C.

2. The process of purifying diffusion juice from sugar beets which comprises treating the juice with pepsin and then liming and carbonating the juice at temperatures of 60° to 80° C.

3. The process of purifying diffusion juice from sugar beets which comprises adding pepsin thereto to act on the proteins in the juice, liming the juice at a temperature of about 60° C. to not more than 80° C., carbonating the limed juice, filtering the carbonated juice while at a temperature not exceeding 80° C., carbonating the filtrate and filtering.

4. The process of purifying diffusion juice from sugar beets which comprises adding pepsin thereto to act on the proteins in the juice, adding about 2 to 5 percent of lime, based on the weight of beets, to the juice, maintaining the juice at a temperature of about 60° C. and not more than 80° C., carbonating and filtering the heated juice, re-carbonating and filtering.

5. In the process of purifying diffusion juice from sugar beets, the steps which include treating the juice with pepsin, and then liming and carbonating at temperatures not exceeding 80° C. prior to a final filtration of carbonated juice having standard alkalinity.

6. The process of purifying diffusion juice from sugar beets which comprises adding pepsin thereto, maintaining the juice at a temperature of about 50° C. to 60° C. for about thirty to ninety minutes to permit the enzyme to act on the protein constituents in the juice, liming the juice so that about 2% to 5% of lime based on the beets is present, carbonating the limed juice at a temperature of about 60° C. to 80° C. until a break is obtained, filtering to remove solids, recarbonating the juice at a temperature of about 75° C., heating the juice to a temperature of about 90° C. and filtering.

7. The process of purifying diffusion juice from sugar beets, which comprises adding thereto a proteolytic enzyme selected from the group consisting of pepsin and rennet, maintaining the juice at a temperature from about 50° C. to 60° C. for a period of time sufficient to permit the enzyme to act on the protein constituents in the juice, liming the juice so that about 2% to 5% of lime based on the beets is present, carbonating the limed juice at a temperature of about 60° C. to 80° C. until a break is obtained, filtering to remove solids, recarbonating the juice at a temperature of about 75° C., heating the juice to a temperature of about 90° C. and filtering.

HERMAN SCHREIBER.